US010851716B2

(12) United States Patent
Breitbach et al.

(10) Patent No.: US 10,851,716 B2
(45) Date of Patent: Dec. 1, 2020

(54) METHOD FOR OPERATING A SYSTEM IN WHICH A MANIPULATED VARIABLE OF AN ACTUATOR ELEMENT CAN BE CONTROLLED

(75) Inventors: Thomas Breitbach, Backnang (DE); Jens Pawlak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1048 days.

(21) Appl. No.: 13/417,762

(22) Filed: Mar. 12, 2012

(65) Prior Publication Data

US 2012/0232770 A1    Sep. 13, 2012

(30) Foreign Application Priority Data

Mar. 11, 2011    (DE) .................. 10 2011 005 463

(51) Int. Cl.
| | | |
|---|---|---|
| *F02D 11/10* | (2006.01) | |
| *F02D 41/22* | (2006.01) | |
| *F02B 39/16* | (2006.01) | |
| *F02B 37/18* | (2006.01) | |
| *F02D 41/00* | (2006.01) | |
| *F02B 37/24* | (2006.01) | |
| *F02M 26/00* | (2016.01) | |

(52) U.S. Cl.
CPC ............ *F02D 11/107* (2013.01); *F02B 39/16* (2013.01); *F02D 41/221* (2013.01); *F02B 37/18* (2013.01); *F02B 37/24* (2013.01); *F02D 41/0007* (2013.01); *F02M 26/00* (2016.02); *Y02T 10/40* (2013.01)

(58) Field of Classification Search
CPC .......... F02B 37/18; F02B 37/24; F02B 39/16; F02D 11/107; F02D 41/0007; F02D 41/221; F02M 25/07; Y02T 10/40

USPC ....... 123/672, 674, 676, 683, 684, 690, 695, 123/696, 568.11–568.32, 399, 90.11, 123/90.12; 701/101, 102, 103, 106, 108, 701/109, 110, 114; 702/105; 60/605.2, 60/324, 600, 602; 73/114.33, 114.36, 73/114.37, 114.69, 114.74

See application file for complete search history.

(56) References Cited

U.S. PATENT DOCUMENTS 3,021,064 A  *  2/1962  Steele ....................... G06F 7/60
708/7
3,857,078 A  *  12/1974  Sawyer ................ G05D 3/1418
318/135

(Continued)

FOREIGN PATENT DOCUMENTS

| CN | 1415046 | 4/2003 |
|---|---|---|
| CN | 101371024 | 2/2009 |

OTHER PUBLICATIONS

Fourier Series—from Wolfram MathWorld.pdf.*

*Primary Examiner* — Carl C Staubach
(74) *Attorney, Agent, or Firm* — Michael Best & Friedrich LLP

(57) ABSTRACT

A method (10) is described for operating a system (12), for example a hydraulic or pneumatic system (12), in which a manipulated variable of an actuator element (16) can be controlled, and in which at least one variable (26) which is dependent on the manipulated variable of the actuator element (16) can be determined, wherein the manipulated variable of the actuator element (16) is modulated with a first periodic signal (22), and wherein a measurement signal (30) which characterizes the at least one variable (26) is evaluated using at least one second periodic signal (47).

21 Claims, 5 Drawing Sheets

(56) References Cited

U.S. PATENT DOCUMENTS

| | | | |
|---|---|---|---|
| 5,140,961 A * | 8/1992 | Sawamoto et al. | 123/406.27 |
| 6,714,849 B1 * | 3/2004 | Ferrero | 701/51 |
| 8,788,235 B2 * | 7/2014 | Bleile et al. | 702/113 |
| 2006/0293832 A1 * | 12/2006 | Schwarzenthal et al. | 701/114 |
| 2007/0169752 A1 * | 7/2007 | Snopko et al. | 123/467 |
| 2009/0205903 A1 * | 8/2009 | Evert et al. | 181/206 |
| 2010/0324857 A1 * | 12/2010 | Bleile et al. | 702/138 |
| 2010/0332180 A1 * | 12/2010 | Seidel et al. | 702/145 |
| 2011/0023481 A1 * | 2/2011 | Baeuerle | 60/602 |
| 2011/0271756 A1 * | 11/2011 | Lalla | 73/32 A |
| 2011/0288453 A1 * | 11/2011 | Endo | 601/35 |
| 2012/0250128 A1 * | 10/2012 | Pinter | 359/199.4 |

* cited by examiner

METHOD FOR OPERATING A SYSTEM IN WHICH A MANIPULATED VARIABLE OF AN ACTUATOR ELEMENT CAN BE CONTROLLED

BACKGROUND OF THE INVENTION

The invention relates to a method of operating a system (e.g., an exhaust system of an internal combustion engine) using a plurality of modulated signals.

Exhaust systems in motor vehicles in which an exhaust gas recirculation system and/or a turbocharger are used are known commercially. In such systems, for example the quantity of recirculated exhaust gas is controlled by means of what is referred to as an exhaust gas recirculation valve (EGR valve). In order to meet legal requirements, it may be necessary to detect a defect in the EGR valve within the scope of what is referred to as on-board diagnostics. For example, the EGR valve may have a delayed actuating behavior or even stick.

One possible way of diagnosing the state or the behavior of the EGR valve is, for example, to form an integral from the product of the deviation of an actual value from a setpoint value of the recirculated air mass and the increase in an associative setpoint value curve. This means essentially a measure of the area between the actual value curve and the associative setpoint value curve of the air mass flow. The integral value (the residual) after the expiry of a cumulated enable time can therefore be compared with a threshold value, and when the threshold value is exceeded it is possible to infer that there is an error (symptom). A comparable procedure can also be used to monitor an air mass flow.

A further possible way of diagnosing the actuator elements contained in the exhaust system may be applied, for example, to the turbocharger by applying a sinusoidal oscillation ("modulation signal") to an actuator of the turbocharger (VTG actuator; VTG means "variable turbine geometry") in an idling mode of the motor vehicle. At the same time, a signal ("measurement signal") which characterizes a charge pressure and/or an air mass flow is evaluated by forming a feature (residual) from the integral of the Fourier transformand of the signal, the value of which feature is compared with a threshold value. It is possible to derive therefrom whether there is a fault in the VTG actuator, for example difficulty of movement or sticking.

SUMMARY OF THE INVENTION

The invention takes into account the fact that a system, for example a hydraulic or pneumatic system, is frequently subjected to a multiplicity of influencing variables. This makes it more difficult to check and/or monitor the satisfactory functioning of a specific actuator element of the system, in particular the control of a manipulated variable of the actuator element. In this context, the invention is based on the idea that the functioning of the actuator element can be particularly easily and reliably checked if a reaction of the system which is dependent on the actuator element can be clearly determined. If appropriate, this reaction can take place, or be determined, at virtually any desired location in the system.

According to the invention, at least one variable which is dependent on the manipulated variable of the actuator element is therefore determined, wherein the manipulated variable is modulated with a first periodic signal. Furthermore, a measurement signal which characterizes the variable, and which as far as possible has the same frequency as the first periodic signal, is evaluated using at least a second periodic signal. Depending on the refinement of the invention it may also be necessary for the second periodic signal to have a fixed phase, preferably the same phase, in relation to the measurement signal. In this context, the measurement signal can have a phase which is different from zero, owing to transit time effects of the system with respect to the first periodic signal. Furthermore, a respective operating state of the system can influence the transit times and/or phases.

The modulation of the manipulated variable provides a precondition for checking or monitoring the actuator element selectively with respect to frequency by means of what is referred to as a lock-in method, wherein the signal-to-noise ratio for undesired components of the measurement signal is improved. As a result, the actuator element which is acted on according to the invention can be assessed in respect of its behavior and faults can therefore be detected more reliably. Basically, the method according to the invention can be carried out in various ways, that is to say said method can be carried out by means of an electronic circuit or by means of a digital data processing system ("software") in an open-loop and/or closed-loop control device of the system. It is likewise possible to divide the execution of the method between the two alternatives as desired.

The method according to the invention has the advantage that the control of the manipulated variable of the actuator element, in particular of an actuator element of an exhaust gas recirculation system, can be checked and/or monitored particularly easily, quickly and reliably. Furthermore, the method can be applied in a wide operating range of the system, in a steady-state and/or dynamic fashion, thereby permitting continuous diagnostics. Phase adaptation which is necessary for this between the measurement signal and the second periodic signal takes place automatically or can even be dispensed with. It is likewise not necessary to perform manual setting of the phase. Furthermore, legal requirements can be satisfied better and failures of system components can be prevented. Additional sensors and the like are frequently not necessary to carry out the method, which allows a saving in costs.

The method is particularly useful if the system is a hydraulic or pneumatic system, in particular an air system and/or an exhaust system of an internal combustion engine of a motor vehicle. The advantages due to the method may allow legal requirements relating to the operation of the internal combustion engine of the motor vehicle to be met more easily and more reliably.

In particular, the invention provides that the actuator element is an exhaust gas recirculation valve, a charge pressure actuator of a turbocharger, in particular a VTG actuator or a waste gate actuator of the turbocharger, or a throttle valve for controlling an air mass flow. For example, the through-flow cross section of a bypass around the turbocharger can be changed by means of a charge pressure control valve. These elements can be particularly critical for the operation of the internal combustion engine which drives the motor vehicle and/or for compliance with corresponding legal regulations. The frequency-selective method permits the reliability of diagnostics of these elements to be improved. The internal combustion engine can be embodied as a diesel engine, as a spark ignition engine or as some other kind of internal combustion engine. Said throttle valve can also be some other actuator element for controlling the air mass flow in the intake path of the internal combustion engine. The abbreviation "VTG" means "variable turbine geometry", which permits the positioning of the guide vanes of a turbine or of a turbocharger to be changed.

A refinement of the method provides that the first periodic signal is a square-wave signal or a sinusoidal signal. The sinusoidal signal has the advantage that only a single frequency component is used to excite the actuator element or the system. The square-wave signal has the advantage that, given digital signal processing, it can be formed better with a low sampling rate and/or can be determined better than a sinusoidal signal of the same frequency.

A further refinement of the invention provides that the second periodic signal is derived from the measurement signal by means of a phase locked loop. This may be done, for example, using a voltage-controlled oscillator (VCO) when the method is carried out by means of an electronic circuit. Said oscillator (VCO) constitutes a type of "reference signal" from which the second periodic signal is formed, if appropriate after adaptation of the phase angle. When the method is carried out by means of software, equivalent algorithms or method steps may be applied. The reference signal or the second periodic signal which is derived in this way can be sinusoidal or square-wave shaped. This refinement has the advantage that the second periodic signal can be derived without using the first periodic signal.

A further refinement of the method provides that the second periodic signal is derived from the first periodic signal and the measurement signal by means of a phase locked loop. In this context, the phase locked loop comprises, instead of the oscillator or the reference signal, a comparatively simple phase actuator element which is actuated with the first periodic signal. This refinement has the advantage that the frequency of the second periodic signal always corresponds to the frequency of the first periodic signal, as a result of which transient recovery times can be reduced and the reliability of the diagnostics can be increased.

For both refinements just described, there is provision that the measurement signal is multiplied by the second periodic signal and that the product which is formed in this way is filtered, for example by means of a PT1 element (low-pass filter), and compared with a threshold value. In this context, the second periodic signal is preferably generated in such a way that it is in phase with the measurement signal and thus the product ("lock-in" signal) which is formed by the multiplication can have the maximum value. As a result, the evaluation of the measurement signal can take place in a frequency-selective fashion, with the result that after the filtering substantially only the signal components which are caused by the first periodic signal are left over. As a result, the signal-to-noise ratio is improved. The evaluation of the measurement signal which has taken place in this way can subsequently be used to evaluate the actuator element which has been acted on according to the invention, in respect of possible faults or faulty behavior. In addition there is provision that a characteristic curve gradient which is determined in the process is compared with an applied characteristic curve gradient. In this context, the filtered product, that is to say the output signal of the PT1 element, behaves substantially in proportion with the gradient of the measurement variable in relation to the manipulated variable of the actuator element ("actuator position") or of the first periodic signal.

A further refinement of the invention provides that the second periodic signal is derived from the first periodic signal, wherein the second periodic signal has a first phase in relation to the first periodic signal, and in that a third periodic signal is derived from the first or second periodic signal, wherein the third periodic signal has a second phase in relation to the second periodic signal. This refinement provides the precondition for a synchronous, complex-valued "demodulation" of the measurement signal. As a result, a particularly rapid and reliable evaluation of the measurement signal and therefore "robust" diagnostics of the actuator element are possible. The expenditure on computing and the memory requirement in an open-loop and/or closed-loop control device which carries out the method can be reduced in this way. In particular, the measurement signal can be evaluated substantially independently of a specific value of said first phase if the first phase remains at least approximately constant or only has comparatively small changes. A phase locked loop for an "automatic phase adjustment" can therefore be dispensed with with respect to the generation of the second periodic signal.

Alternatively there is provision that the second periodic signal is derived from the measurement signal by means of a phase locked loop, wherein the second periodic signal has a first phase in relation to the measurement signal, and that the third periodic signal is derived from the second periodic signal or the measurement signal, wherein the third periodic signal has a second phase in relation to the second periodic signal. The derivation of the second and of the third periodic signals can therefore be carried out exclusively from the measurement signal using a phase locked loop ("PLL") and additionally by means of a phase rotation element. As a result, a direct relationship with the first periodic signal is not necessary, allowing the method to be simplified under certain circumstances. For example, the phase locked loop can generate a "reference signal" with a substantially rigid phase with respect to the measurement signal, from which "reference signal" the second and the third periodic signals are subsequently derived.

For both refinements just described, there is additionally provision that the second phase is approximately 90°. As a result, a type of "quadrature demodulation" is carried out, which can easily be applied for the method according to the invention and can supply a particularly precise result.

For both refinements just described, there is also provision that the second and the third periodic signals are multiplied by the measurement signal, and that the products which are formed in this way are squared, and that the squares which are formed in this way are added, and that the sum is compared with a threshold value. In addition, before the comparison with the threshold value, a root operation can also be applied to the sum of the squares. If the second phase is 90°, the mathematical relationships explained below can be used:

$$Y_{LockInOut1} \sim A \cdot \cos(\theta)$$

$$Y_{LockInOut2} \sim A \cdot \cos(\theta - 90°) \text{ or } Y_{LockInOut2} \sim A \cdot \sin(\theta)$$

$$S = \sqrt{(Y_{LockInOut1}^2 + Y_{LockInOut2}^2)}$$

$$\sin^2(x) + \cos^2(x) = 1; \text{ where}$$

$Y_{LockInOut1}$=product of the second periodic signal with the measurement signal, $Y_{LockInOut2}$=product of the third periodic signal with the measurement signal, A=amplitude of the measurement signal corresponding to the modulation carried out by the first periodic signal, θ=phase difference between the second periodic signal and the measurement signal; and S=root of the sum of the squares of $Y_{LockInOut1}$ and $Y_{LockInOut2}$.

It is apparent that the variable S can supply a signal which depends essentially on the amplitude A and not on the phase difference θ. It is therefore not significant whether or not the reference signal or the second and the third periodic signals have a specific phase relationship with the measurement signal.

It is particularly beneficial if a frequency of the first periodic signal is selected as a function of a rotational speed of the internal combustion engine of the motor vehicle, in particular that the frequency and the rotational speed have a nonintegral relationship with one another. This provides the possibility of keeping interference components of the measurement signal—which happen to have the frequency of the second or third periodic signal but are not caused by the inventive modulation by means of the first periodic signal— out of the frequency range which is essential for the method. Interference due to other frequencies which are already present in the system is therefore avoided as far as possible. For example, such interference components may be dependent on the crankshaft rotational speed or the camshaft rotational speed and may be caused, under certain circumstances, by the activation of the inlet valves and/or of the outlet valves. In particular, it is possible according to the invention to adapt the frequency of the first periodic signal dynamically as a function of the respective rotational speed of the internal combustion engine. This permits the accuracy of the method to be further improved.

A further refinement of the method provides that it is carried out at least partially by means of a computer program. The means for carrying out the method can therefore be distributed in virtually any desired fashion between electronic circuits ("hardware") and the computer program ("software"). For example, the method can be carried out by means of an open-loop and/or closed-loop control device of the motor vehicle, wherein the latter comprises a memory on which the computer program is stored.

BRIEF DESCRIPTION OF THE DRAWINGS

In addition, important features for the invention can be found in the following drawings, wherein the features may be important for the invention either in isolation or in different combinations, without reference being made once more explicitly to this.

Advantageous embodiments of the invention are explained below with reference to the drawing, in which.

DETAILED DESCRIPTION

The same reference symbols are used for functionally equivalent elements and variables in all the figures, even for different embodiments.

Figure 1:
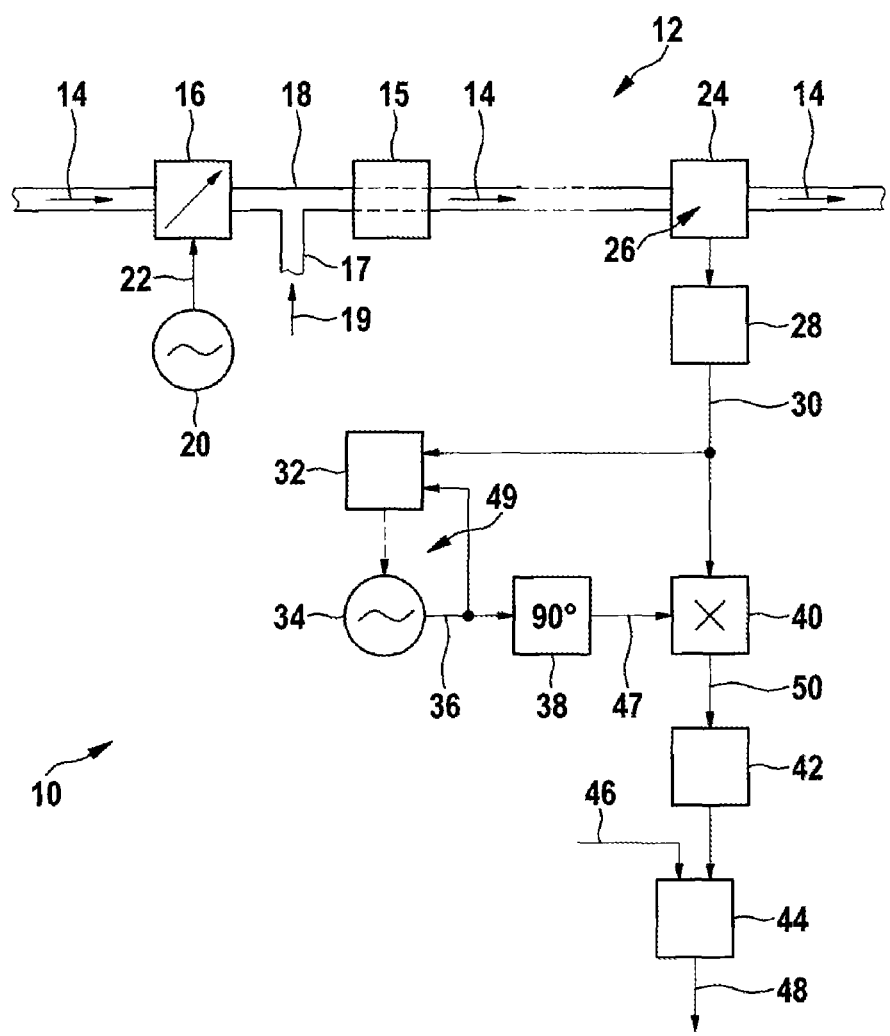
FIG. 1 shows a basic illustration of a first embodiment for carrying out the method.

FIG. 1 shows a first basic illustration for carrying out the method 10 according to the invention. A system 12 ("pneumatic system") is illustrated, here an air system and an exhaust system of an internal combustion engine 15 of a motor vehicle, through which, according to arrows 14 in the drawing, there is a flow from left to right of air or of exhaust gas of the internal combustion engine 15. In the left-hand upper region of the drawing, an actuator element 16 is arranged which has here a valve for controlling exhaust gas recirculation and a controllable through-flow cross section ("manipulated variable") with which a quantity of air or quantity of exhaust gas in a pipe system 18 can be controlled. The pipe system 18 is part of the pneumatic system 12, that is to say of the air system or of the exhaust system. Fresh air is fed via a fresh air feedline 17 in the direction of an arrow 19 in order to operate the internal combustion engine 15.

A generator 20 generates a first periodic signal 22 by means of which the through-flow cross section of the actuator element 16 can be controlled by means of an actuator (not illustrated). As a result, modulation of the through-flow cross section or of the quantity of exhaust gas flowing through the actuator element 16 is achieved here. At the top right of the drawing, a sensor 24 is arranged in the exhaust train of the motor vehicle in the pneumatic system 12. The sensor 24 comprises, for example, an exhaust gas probe (not illustrated). A variable 26 which is determined in the sensor 24 is dependent on the through-flow cross section of the actuator element 16. A block 28 generates a measurement signal 30 from a signal which characterizes the variable 26.

An evaluation device for evaluating the measurement signal 30 is arranged in the lower region of the drawing in FIG. 1. The evaluation device comprises a closed-loop control device 32 which comprises a phase comparator—for example a multiplier—and a control amplifier—for example what is referred to as a PI controller, a generator 34 with an adjustable frequency for generating an oscillating reference signal 36, a phase rotation element 38 which carries out a phase rotation through 90° here, a multiplier 40 which multiplies a second periodic signal 47, generated by the phase rotation element 38, by the measurement signal 30, a filter 42 in which a product 50 which is generated by the multiplier 40 is filtered, and a comparator 44 which can compare an output signal of the filter 42 with a threshold value 46. An output signal 48 of the comparator 44 is fed below to further devices for evaluating the method 10 or for evaluating the state of the actuator element 16. However, these devices are not included in the illustration in FIG. 1.

As an alternative to the senor 24 arranged in the exhaust train, the variable 26 can also be determined by means of another sensor of the system 12 if the variable 26 is dependent on the manipulated variable of the actuator element 16. For example, the variable 26 can be a charge pressure or an air mass flow in the fresh air feedline 17, and the sensor 24 can be, for example, a hot film air mass meter. However, this is not illustrated in FIG. 1.

The method 10 according to the invention is carried out by modulating the through-flow cross section of the actuator element 16 at least temporarily by the first periodic signal 22. Here, an amplitude of this modulation is set in such a way that satisfactory operation of the pneumatic system 12 or of the motor vehicle is not adversely affected. In particular, the amplitude can be set in such a way that the influence thereof on the air system and/or the exhaust system is approximately linear. The effect of the modulation according to the invention is therefore averaged out and therefore remains essentially neutral in relation to the production of soot or nitrogen oxides (NOx).

The variable 26 which is determined by the sensor 24 has periodic fluctuations during satisfactory behavior of the actuator element 16, which fluctuations are dependent on the modulation carried out by means of the first periodic signal 22. The measurement signal 30 has fluctuations which correspond thereto. For example, the generator 20 is a sinusoidal generator and correspondingly the measurement signal 30 has an at least approximately sinusoidal profile. The closed-loop control device 32 continuously compares the phase of the measurement signal 30 with the phase of the reference signal 36 and adjusts the frequency of the generator 34 in accordance with the frequency and phase of the measurement signal 30. This is also known as what is referred to as a phase locked loop 49 (PLL). The phase control takes place in such a way that the phases of the input signals which are applied to the closed-loop control device 32 have a phase offset of 90° with respect to one another. Correspondingly, the phase of the reference signal 36 in the phase rotational element 38 is shifted by a value of 90°, with the result that the two input signals of the multiplier 40 essentially have a phase difference of 0° with respect to one another.

The multiplier 40 generates a product 50 which corresponds essentially to the square of a sinusoidal function. The product 50 is subsequently filtered in the filter 42 in such a way that essentially low-pass filtering is performed. As a result, possible interference signals which have frequencies outside the spectrum generated by the generator 20 are effectively suppressed. For example, the output signal of the filter 42 corresponds to a comparatively slow variable direct voltage signal. This signal is subsequently compared with the threshold value 46 in the comparator 44. The output signal 48 therefore contains the information indicating whether the threshold value 46 is exceeded or undershot at a particular time. This information can be used subsequently to evaluate the state or the functional capability of the actuator element 16.

It is particularly advantageous if a frequency of the first periodic signal 22 is selected as a function of a rotational speed of the internal combustion engine 15 of the motor vehicle, in particular if the frequency and the rotational speed have a nonintegral relationship with respect to one another. As a result, interference components of the measurement signal 30 which happen to have the frequency of the second periodic signal 47 can be kept out of the frequency range which is essential for the method 10.

Of course, the pneumatic system 12 (shown in FIG. 1) and the method 10 which is applied thereto are not restricted to the illustrated actuator elements 16 (exhaust gas recirculation valve) or to the illustrated sensor 24 (exhaust gas probe). The actuator element 16 can therefore be any desired valve of the motor vehicle, for example a throttle valve for controlling an air mass flow or else a VTG actuator ("VTG"=variable turbine geometry") of a turbocharger. The sensor 24 can be any desired sensor for determining a variable 26 if a change in the manipulated variable of the actuator element 16 can influence the variable 26. Likewise, any desired parts of the method 10 described in FIG. 1 can, of course, be carried out by means of an electronic circuit and/or by means of a digital data processing means (computer program) in an open-loop and/or closed-loop control device of the system or of the motor vehicle.

Figure 2:
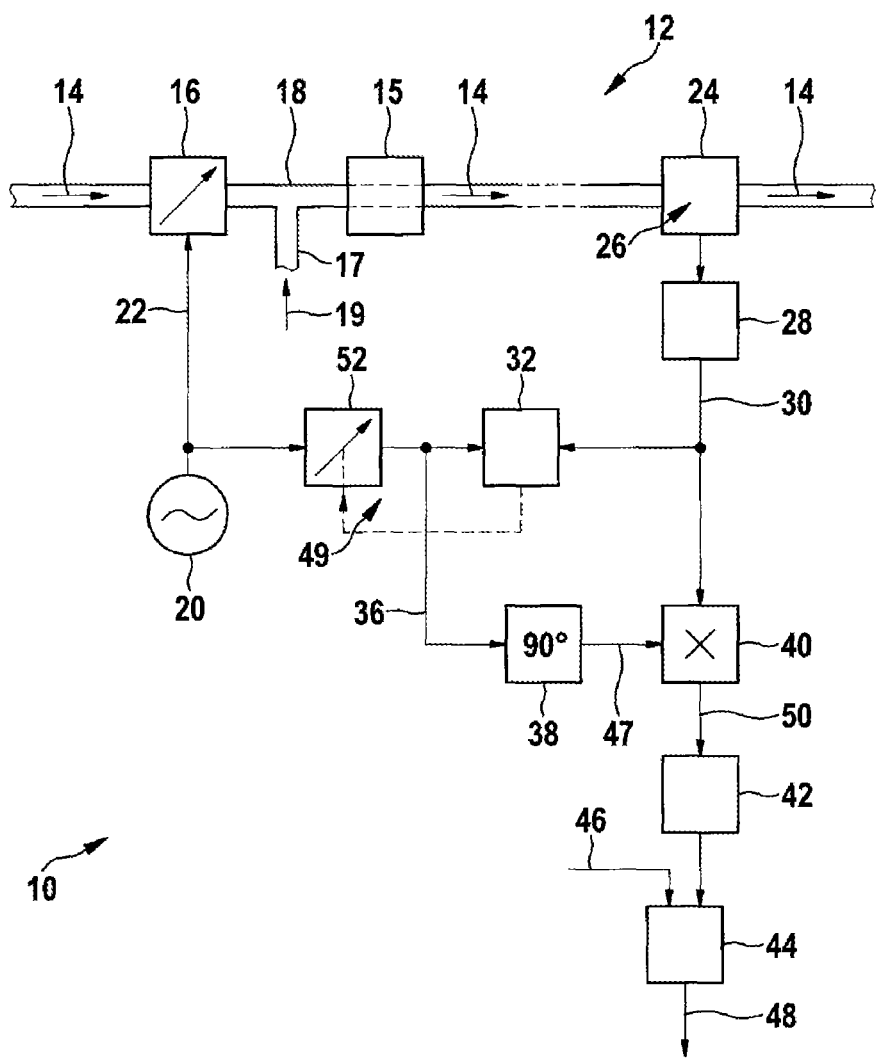
FIG. 2 shows a basic illustration of a second embodiment for carrying out the method.

FIG. 2 shows a basic illustration, as an alternative to FIG. 1, for carrying out the method 10. In contrast to FIG. 1, the reference signal 36 from FIG. 2 is not generated from the generator 34 but is instead derived from the first periodic signal 22 by means of a phase shifter 52.

In FIG. 2, the closed-loop control device 32 compares the phase of the measurement signal 30 with an output signal of the phase shifter 52. Here, the output signal is directly the reference signal 36. The phase offset which can be set by the phase shifter 52 is adjusted by the closed-loop control device 32 in accordance with a phase difference of the measurement signal 30 with respect to the reference signal 36. The function of the other blocks illustrated in FIG. 2 corresponds to those in FIG. 1.

Figure 3:
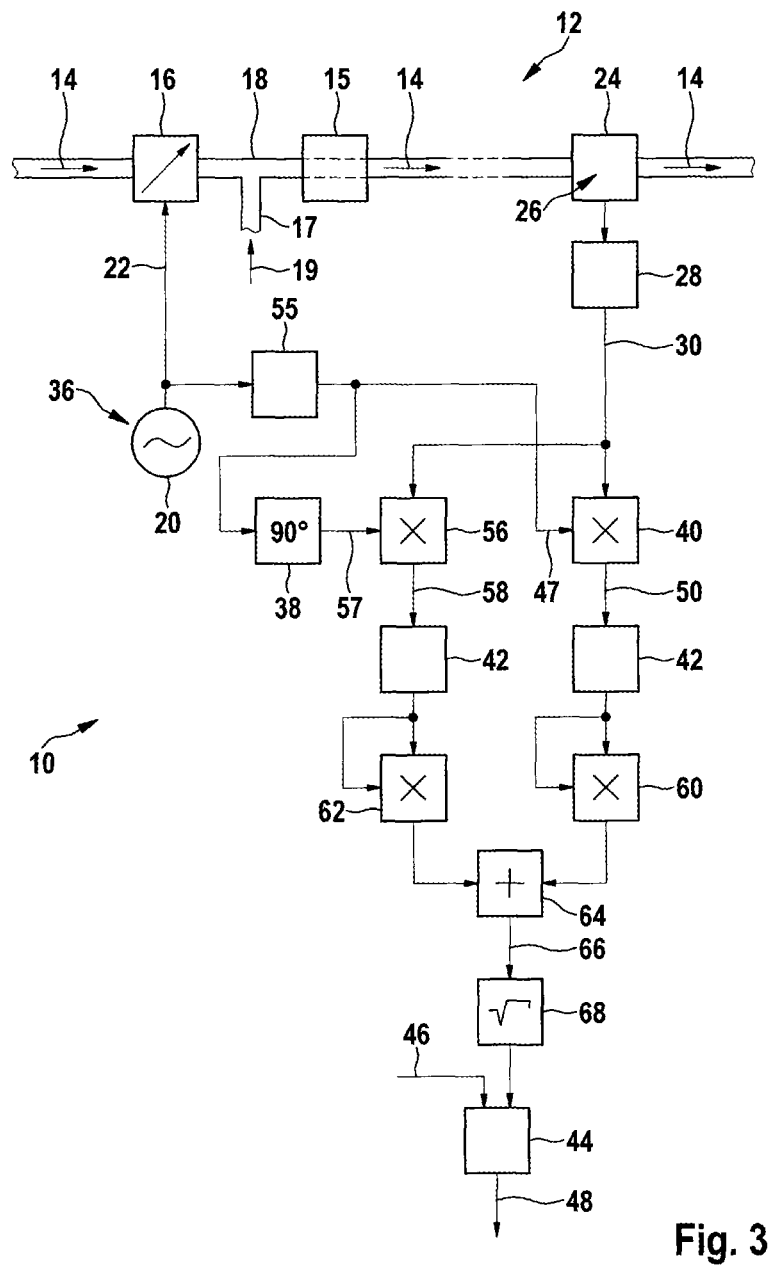
FIG. 3 shows a basic illustration of a third embodiment for carrying out the method.

FIG. 3 shows a third basic illustration for carrying out the method 10. The generation of the first periodic signal 22, the operation of the pneumatic system 12 or of the air system and of the exhaust system of the motor vehicle, and the generation of the measurement signal 30 correspond to those of FIGS. 1 and 2. In contrast to FIGS. 1 and 2, in FIG. 3 the measurement signal 30 is transmitted not only to a first input of the multiplier 40 but likewise to a first input of the multiplier 56. A second input of the multiplier 40 is actuated by the second periodic signal 47, which is derived here from the first periodic signal 22 by means of a block 55. The block 55 can be a simple linear amplifier or a voltage divider or the like. A second input of the multiplier 56 is actuated by a third periodic signal 57 which is formed from the second periodic signal 47 after passing through the phase rotation element 38. The product 50 which is generated in the multiplier 40 and the product 58 which is generated in the multiplier 56 are each filtered in a filter 42. The output signals of the filters 42 are each squared in a squaring device 60 or a squaring device 62. The output signals of the squaring devices 60 and 62 are then added in an adding element 64. The square root is extracted from a sum signal 66 of the adding element 64 in a subsequent block 68. The output signal of the block 68 is compared with the threshold value 46 in the comparator 44, in a similar way to as has already been described in FIG. 1.

During operation, the respective second input signals of the multiplier 40 and of the multiplier 56 have a phase offset of 90° with respect to one another. As a result, the following mathematical approach can be established:

$$Y_{LockInOut1} \sim A \cdot \cos(\theta)$$

$$Y_{LockInOut2} \sim A \cdot \cos(\theta - 90°) \text{ or } Y_{LockInOut2} \sim A \cdot \sin(\theta)$$

$$S = \sqrt{(Y_{LockInOut1}^2 + Y_{LockInOut2}^2)}$$

$$\sin^2(x) + \cos^2(x) = 1; \text{ where}$$

$Y_{LockInOut1}$=product 50 of the second periodic signal 47 with the measurement signal 30, $Y_{LockInOut2}$=product 58 of the third periodic signal 57 with the measurement signal 30, A=amplitude of the measurement signal 30 corresponding to the modulation carried out by the first periodic signal 22, θ=phase difference between the second periodic signal 47 and the measurement signal 30; and S=root of the sum of the squares of $Y_{LockInOut1}$ and $Y_{LockInOut2}$.

It is apparent that the variable S or the sum signal 66 depends essentially on the amplitude A of the measurement signal 30 and not on the phase difference θ. As a result it is irrelevant whether the second and the third periodic signals 47 and 57 have a specific phase relationship with the measurement signal 30 or not.

Just as in FIGS. 1 and 2, the output signal 48 of the comparator 44 is subsequently fed to further devices for evaluating the method 10 and for assessing the state of the actuator element 16. These further devices are, however, not illustrated in FIG. 3.

Alternatively, the second and third periodic signals 47 and 57 can also be derived from the measurement signal 30 by using a phase locked loop 49, similarly to as was described in FIG. 1. This is, however, not shown in FIG. 3.

Figure 4:
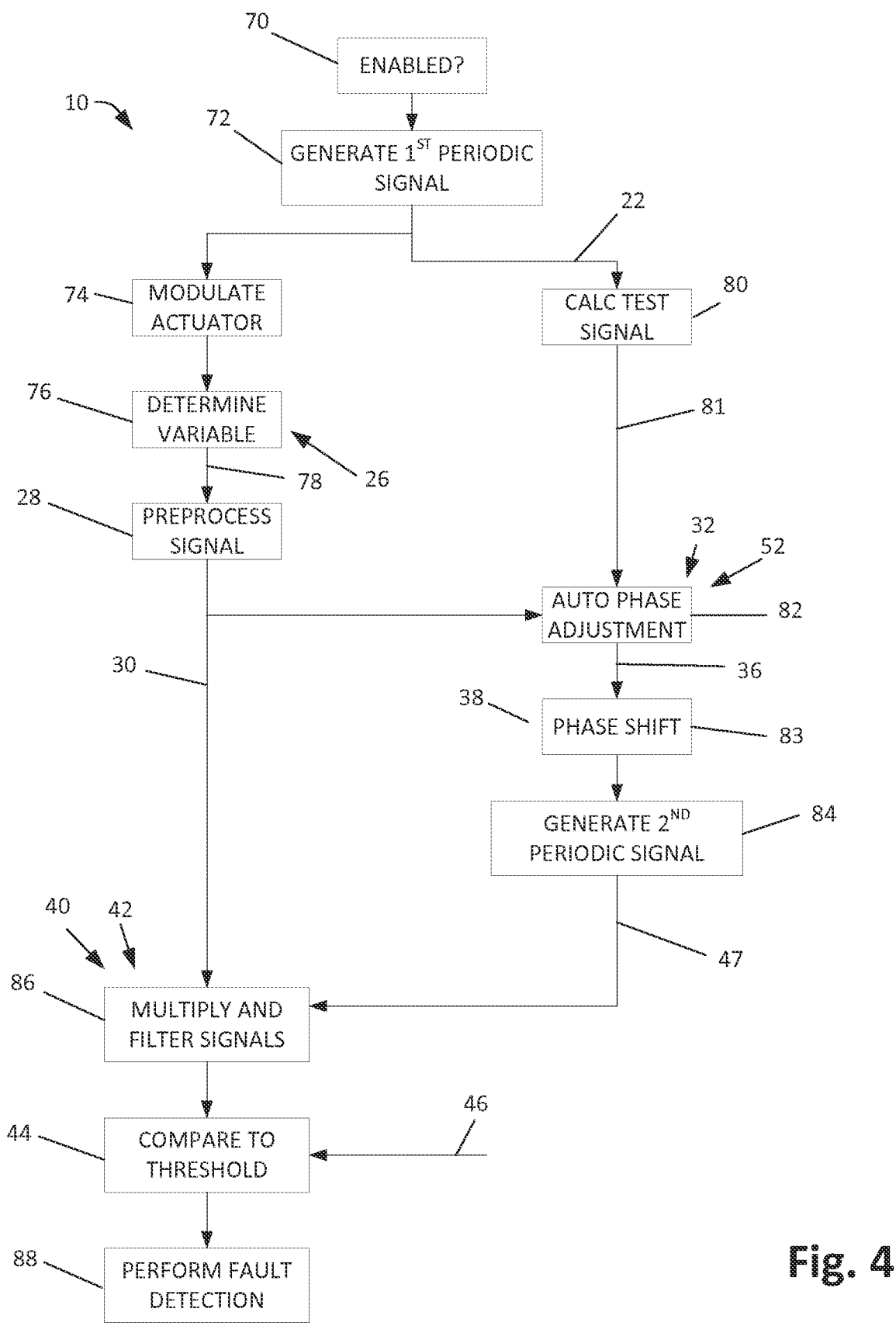
FIG. 4 shows a first flow diagram for carrying out the method.

FIG. 4 shows a first flow diagram for carrying out the method 10. The processing of the flow diagram takes place in FIG. 4 essentially from top to bottom. In a first block 70 it is checked whether the pneumatic system 12, here the air system and the exhaust system of a motor vehicle, are in a suitable state to carry out the method 10. If these so-called enable conditions are present, a following block 72 is triggered, by means of which the first periodic signal 22 (stimulation signal) can be generated. The first periodic signal 22 has for this purpose a certain amplitude and frequency and is, for example, square-wave shaped. After the block 72 has been passed through, the processing of the flow diagram in FIG. 4 branches essentially into a left-hand branch and into a right-hand branch in the drawing.

In the block 74 of the left-hand branch, the through-flow cross section of the actuator element 16 is modulated with the first periodic signal 22. In a following block 76, at least one variable of the pneumatic system 12, for example an air mass flow or a charge pressure, is determined. This is done, for example, by using a sensor 24 which is, for example, a charge pressure sensor or an air mass meter. A signal 78 of the block 76, which characterizes the variable 26, is subjected to signal pre-processing in the following block 28, on the basis of which the measurement signal 30 is formed. The signal pre-processing comprises, for example, the formation of a sliding average value and subsequent subtraction of this average value from the signal 78.

In a first block 80 of the right-hand branch in the drawing in FIG. 4, a "test signal" is calculated after the block 72 has been passed through. The method steps illustrated in FIG. 4 are in large part similar or identical to the elements of FIG. 2. The output signal 81 which is generated in the block 80 is used, together with the measurement signal 30 generated in the block 28, in a subsequent block 82 to bring about an automatic phase adjustment (first "lock-in" amplifier) and therefore to generate the reference signal 36. The reference signal 36 is used in a subsequent block 83, which corresponds essentially to the phase rotation angle 38, to bring about a suitable phase shift—preferably 90°—to actuate the multiplier 40 (second "lock-in" amplifier).

The output signal of the block 83 is used in the block 84 to generate the second periodic signal 47. The left-hand branch and the right-hand branch in the drawing in FIG. 4 are subsequently combined again in a block 86 by multiplying the measurement signal 30 by the second periodic signal 47. In addition, filtering of the product 50 is carried out in the block 86. A "lock-in signal" is therefore calculated from the second periodic signal 47 and the measurement signal 30 (second "lock-in" amplifier). In the following block 44, a symptom formation is brought about in such a way that the output signal of the block 86 is compared with the threshold value 46. A symptom evaluation, that is to say fault detection, is carried out on the basis of the result of the comparison in a following block 88. It is therefore possible to assess whether the actuator element 16 which is modulated in the block 74 is in a satisfactory state.

Figure 5:
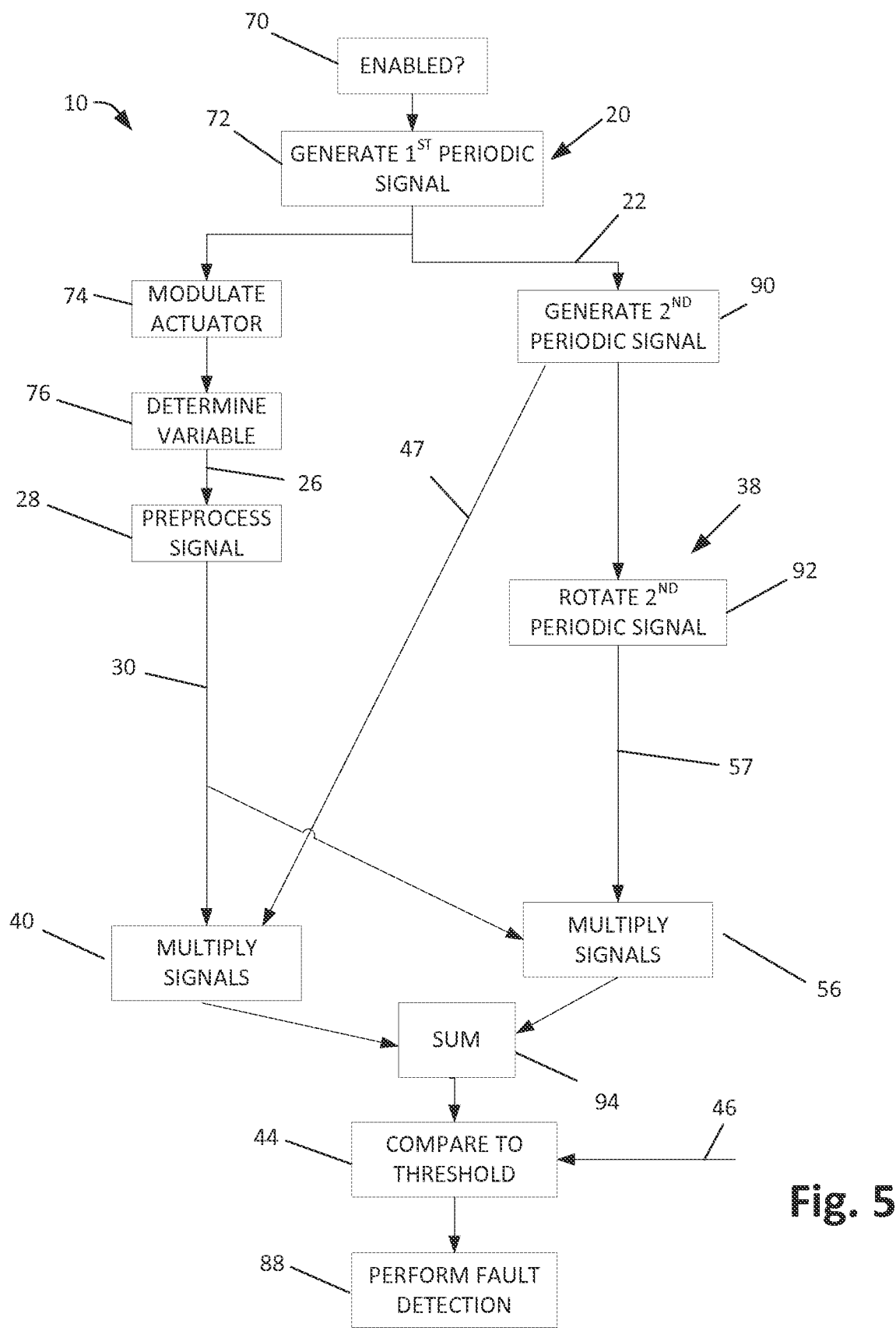
FIG. 5 shows a second flow diagram for carrying out the method.

FIG. 5 shows a further flow diagram, which is an alternative to that in FIG. 4, for carrying out the method 10 according to the invention. Many of the elements and/or method steps illustrated in FIG. 5 are similar or identical to those in FIG. 3.

Blocks 70, 72, 74 and 76 and 28 of FIG. 5 correspond to those in FIG. 4. Similarly to FIG. 4, the processing of the flow diagram illustrated in FIG. 5 takes place essentially from top to bottom in the drawing.

The second periodic signal 47 is formed on the basis of the output signal of the block 72, that is to say the first periodic signal 22, in a block 90. The second periodic signal 47 corresponds essentially to the first periodic signal 22; however, if appropriate, it has a different phase. The second periodic signal 47 is rotated through 90° in its phase in the following block 92, which corresponds essentially to the phase rotation element 38. This results in the third periodic signal 57.

A subsequent first multiplier 40 (first "lock-in" amplifier) is actuated at its first input by the measurement signal 30 and at its second input by the second periodic signal 47. A second multiplier 56 (second "lock-in" amplifier) is actuated at its first input by the measurement signal 30 and at its second input by the third periodic signal 57. In a subsequent block 94, the geometric sum is calculated from the two output signals of the multipliers 40 and 56, similarly to as is illustrated in FIG. 3. The output signal of the block 94 is compared with the threshold value 46 in the following comparator 44. The output signal of the comparator 44 is used in a following block 88 to carry out the symptom evaluation (fault detection).

The method 10 according to the flow diagram in FIG. 5 has the advantage that the output signal of the block 94 depends essentially only on the amplitude of the modulation of the through-flow cross section of the actuator element 16 which is carried out in the block 74, but no longer on a phase difference between the respective measurement signal 30 and the respective second input signals of the multipliers 40 and 56. That is to say it is irrelevant whether the second and third periodic signals 47 and 57 are in phase with the measurement signal 30 or not. As a result, the execution of the method 10 is made significantly simpler and more robust.

The invention claimed is:

1. A method (10) for operating an electronic control device (32) of a system (12) of an internal combustion engine in which a through-flow cross section of a valve is modified by an actuator element (16), and in which at least one variable (26) which is dependent on the through-flow cross section of the actuator element (16) is sensed via a sensor, the method comprising:
   modulating, with a first periodic signal (22), the through-flow cross section of the valve;
   generating, based on a measurement of the sensor, a measurement signal (30) which characterizes the at least one variable (26);
   generating a second periodic signal (47) derived from the measurement signal (30) by means of a phase locked loop (49), the second periodic signal (47) having been modified to have a phase difference of zero from the measurement signal (30);
   providing the measurement signal (30) and the second periodic signal (47) to a multiplier which multiplies the measurement signal (30) and the at least one second periodic signal (47) and outputs a product (50) of the measurement signal (30) and the at least one second periodic signal (47); and
   detecting, via the evaluation unit, that there is a fault within the actuator element (16) based on an evaluation of the product (50).

2. The method (10) according to claim 1, characterized in that the system (12) is a hydraulic system (12).

3. The method (10) according to claim 1, characterized in that the system (12) is a pneumatic system (12).

4. The method (10) according to claim 1, characterized in that the system (12) is an air system and/or an exhaust system of an internal combustion engine (15) of a motor vehicle.

5. The method (10) according to claim 1, characterized in that the valve is an exhaust gas recirculation valve.

6. The method (10) according to claim 1, characterized in that the actuator element (16) is a charge pressure actuator of a turbocharger.

7. The method (10) according to claim 6, characterized in that the charge pressure actuator of the turbocharger is a VTG actuator or a waste gate actuator.

8. The method (10) according to claim 1, characterized in that the valve is a throttle valve for controlling an air mass flow.

9. The method (10) according to claim 1, characterized in that the first periodic signal (22) is a square-wave signal or a sinusoidal signal.

10. The method (10) according to claim 1, characterized in that a phase locked loop (49) receives the first periodic signal (22) and the measurement signal (30) and generates a reference signal (36) which is used to generate the second periodic signal (47).

11. The method (10) according to claim 1, characterized in that the product (50) is filtered and compared with a threshold value (46).

12. The method (10) according to claim 1, characterized in that the second periodic signal (47) is derived from the first periodic signal (22), wherein the second periodic signal (47) has a first phase in relation to the first periodic signal (22), and in that a third periodic signal (57) is derived from the first or second periodic signal (22; 47), wherein the third periodic signal (57) has a second phase in relation to the second periodic signal (47).

13. The method (10) according to claim 1, characterized in that the second periodic signal (47) is derived from the measurement signal (30) by a phase locked loop (49), wherein the second periodic signal (47) has a first phase in relation to the measurement signal (30), and in that a third periodic signal (57) is derived from the second periodic signal (47) or the measurement signal (30), wherein the third periodic signal (57) has a second phase in relation to the second periodic signal (47).

14. The method (10) according to claim 12, characterized in that the second phase is approximately 90°.

15. The method (10) according to claim 12, characterized in that the third periodic signal (57) is multiplied by the measurement signal (30), producing a second product (58), and wherein the product (50) and the second product (58) are each squared and added together creating a sum, and in that the sum is compared with a threshold value (46).

16. The method (10) according to claim 4, characterized in that a frequency of the first periodic signal (22) is selected as a function of a rotational speed of the internal combustion engine (15) of the motor vehicle.

17. The method (10) according to claim 16, characterized in that the frequency and the rotational speed have a non-integral relationship with one another.

18. The method (10) according to claim 1, characterized in that said method is carried out at least partially by means of a computer program.

19. A control device for an internal combustion engine (15) of a motor vehicle having an internal combustion engine in which a through-flow cross section of a valve is modified by an actuator element (16), and in which at least one variable (26) which is dependent on the through-flow cross section of the actuator element (16) is sensed via a sensor, the control device configured to:
   modulate, with a first periodic signal (22), the through-flow cross section of the valve;
   generate, based on a measurement of the sensor, a measurement signal (30) which characterizes the at least one variable (26);
   generate a second periodic signal (47) derived from the measurement signal (30) by means of a phase locked loop (49), the second periodic signal (47) having been modified to have a phase difference of zero from the measurement signal (30);
   provide the measurement signal (30) and the second periodic signal (47) to a multiplier which multiplies the measurement signal (30) and the at least one second periodic signal (47) and outputs a product (50) of the measurement signal (30) and the at least one second periodic signal (47); and
   detect, via the evaluation unit, that there is a fault within the actuator element (16) based on an evaluation of the product (50).

20. The control device according to claim 19, wherein the control device is an open-loop control device.

21. The control device according to claim 19, wherein the control device is a closed-loop control device.

* * * * *